(12) United States Patent
Franceschini et al.

(10) Patent No.: US 8,149,264 B2
(45) Date of Patent: Apr. 3, 2012

(54) VIDEO-COMMUNICATION IN MOBILE NETWORKS

(75) Inventors: Daniele Franceschini, Turin (IT); Nicola Pio Magnani, Turin (IT); Andrea Calvi, Turin (IT)

(73) Assignee: Telecom Italia S.p.A., Milano (IT)

( * ) Notice: Subject to any disclaimer, the term of this patent is extended or adjusted under 35 U.S.C. 154(b) by 1411 days.

(21) Appl. No.: 11/658,449

(22) PCT Filed: Jul. 27, 2004

(86) PCT No.: PCT/EP2004/008381
§ 371 (c)(1),
(2), (4) Date: Jan. 26, 2007

(87) PCT Pub. No.: WO2006/010373
PCT Pub. Date: Feb. 2, 2006

(65) Prior Publication Data
US 2008/0309748 A1 Dec. 18, 2008

(51) Int. Cl.
*H04N 7/14* (2006.01)
(52) U.S. Cl. ................... 348/14.12; 348/14.02
(58) Field of Classification Search ............... 348/14.12, 348/14.02, 14.01, 14.03; 379/93.07, 93.08, 379/93.09
See application file for complete search history.

(56) References Cited

U.S. PATENT DOCUMENTS

| | | | |
|---|---|---|---|
| 6,084,911 A * | 7/2000 | Ishikawa | 348/14.13 |
| 6,134,220 A | 10/2000 | Le Strat et al. | |
| 7,596,119 B2 * | 9/2009 | Buckley et al. | 370/331 |
| 2002/0075399 A1 | 6/2002 | Nemiroff et al. | |
| 2002/0077064 A1 | 6/2002 | Ue et al. | |
| 2003/0081592 A1 | 5/2003 | Krishnarajah et al. | |

FOREIGN PATENT DOCUMENTS

| | | |
|---|---|---|
| EP | 1 298 945 A1 | 4/2003 |
| EP | 1 370 101 A1 | 12/2003 |
| WO | WO 95/28814 | 10/1995 |
| WO | WO 95/28814 A1 | 10/1995 |
| WO | WO 01/03461 A1 | 1/2001 |
| WO | WO 01/24555 | 4/2001 |
| WO | WO 01/24555 A1 | 4/2001 |
| WO | WO 2004/045239 A2 | 5/2004 |
| WO | WO 2006/010583 A1 | 2/2006 |

OTHER PUBLICATIONS

Communication pursuant to Article 94(3) EPC dated Jul. 30, 2008 from the European Patent Office in corresponding European application No. 04 763 518.0-1525.

(Continued)

*Primary Examiner* — Stella Woo
(74) *Attorney, Agent, or Firm* — Finnegan, Henderson, Farabow, Garrett & Dunner, L.L.P.

(57) ABSTRACT

A video-communication service in which a separation in different components of the video-communication is caused at the telephone equipment of the users, e.g., a separation in a video and in a voice component. The different components are transmitted on different connections between the telephone equipment of the users. The users have the possibility of selectively dropping any one of the different connections.

36 Claims, 5 Drawing Sheets

OTHER PUBLICATIONS

3GPP TS 43.055 V6.4.0 (Feb. 2004), Technical Specification; 3rd Generation Partnership Project; Technical Specification Group GSM/EDGE Radio Access Network; Dual Transfer Mode; Stage 2 (Release 6), pp. 1-32 (2004).

U. Olsson et al., "Combinational Services—The Pragmatic First Step Toward All-IP," Ericsson Review No. 2, pp. 66-71 (2003).

"ECSD (Enhanced Circuit Switched Data)," ETSI SMG2 Working Session on EDGE, Tdoc SMG2 EDGE 033/99, Source: Nokia, pp. 1-15 (Mar. 1999).

Wang et al., "Video Processing and Communications," Prentice Hall, New Jersey, pp. 529-531 (2002).

* cited by examiner

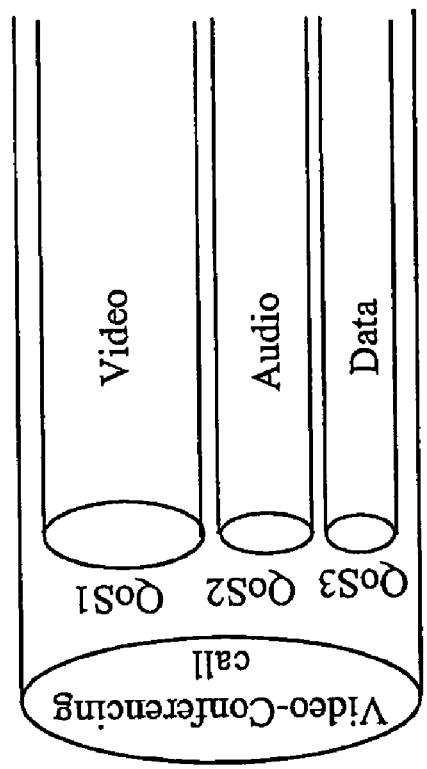
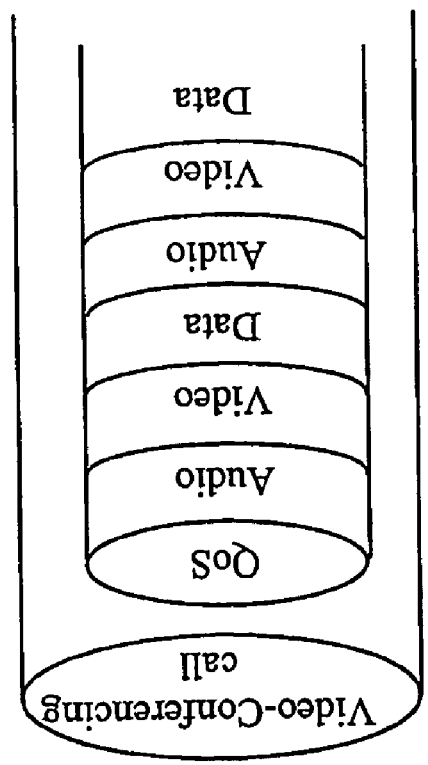
Fig.1

VIDEO-COMMUNICATION IN MOBILE NETWORKS

CROSS REFERENCE TO RELATED APPLICATION

This application is a national phase application based on PCT/EP2004/008381, filed Jul. 27, 2004, the content of which is incorporated herein by reference.

TECHNICAL FIELD OF THE INVENTION

The present invention generally relates to video-communication in communication networks, especially mobile communication networks.

BACKGROUND OF THE INVENTION

Mobile telephony networks have experienced an enormous spread, especially after the introduction of Second Generation (2G) mobile cellular networks, and particularly digital mobile cellular networks such as those complying with the Global System for Mobile communications (GSM) standard (and its United States and Japanese counterparts). The services offered by these cellular networks in addition to plain voice communications have rapidly increased in number and quality; just to cite a few examples, Short Messaging System (SMS), Multimedia Messaging System (MMS) services, and Internet connectivity services have been made available to subscribers of the cellular network in the last few years.

In particular, a great interest is being devoted to multimedia services, that is, in addition to the voice-only person-to-person communication capability, the ability to add images, video, browser data, game board information, and so on.

U. Olsson and M. Nilsson, in the article "Combinational services—The pragmatic first step toward all-IP", Ericsson Review No. 2, 2003, disclose, inter alia, an example of so called "combinational services", in which the ability to simultaneously handle circuit-switched and packet-switched traffic is used: sharing pictures during conversation. The authors notice that the possibility of simultaneously handle circuit-switched and packet-switched is allowed both in WCDMA (Wideband Code Division Multiple Access), that gives the possibility to set-up multiple, parallel bearers over the air interface (multiple radio access bearers, multi-RAB), and in GSM, in which a standardized mechanism—dual transfer mode (DTM)—yields similar possibilities. With particular reference to the latter, the authors disclose that by means of careful slot allocation, DTM enables a single radio to have parallel, simultaneous circuit-switched (CS) and packet-switched (PS) capabilities, allowing a user to send MMS without interrupting an ongoing phone call.

Recently, another service has been proposed for subscribers of mobile networks: video-telephony. Generally speaking, video-telephony allows two users having respective mobile phones to see each other during a phone call. In practice, the mobile phones are provided with a video-camera, so that images recorded by the video-camera of the first user are sent, in real-time, synchronized with the voice, to the second user (and vice-versa), on the bearer supporting the call. This kind of communication requires high data transfer rates and high quality of service (QoS) level.

Video-telephony is currently serviced in UMTS (Universal Mobile Telephone System) networks, in which both video and voice data are carried along a circuit-switched bearer having high data rate, as permitted by UMTS. Video-telephony (or video-conferencing) is also available in fixed (PSTN) networks, in which a circuit-based (e.g. ISDN) connection is established for supporting the service.

PCT published patent application no. WO 01/03461 proposes a method for performing a communication between two terminal equipment via a communication network. The method comprises the steps of establishing a first connection for a communication signal between two terminal equipment, detecting a connection changing condition, and, if said connection changing condition is detected, dividing said communication signal at least into a first component and a second signal component, and establishing at least a second connection, the first signal component (for example a video component) being transmitted via the first connection and the second signal component (for example a speech component) being transmitted via the second connection. The second connection can be a connection similar to the first one (e.g. a UMTS multimedia call connection) or just a (lower capacity) speech call connection. Additionally, in case of a handover, in particular in a handover to a network with lower capacity or which is unable to perform a video-call (for example some GSM networks), by dropping the video component (i.e. the corresponding connection), the multimedia call or at least the speech call can be maintained. According to the authors, in general the second connection is only activated if required (low quality, preparation of handover or the like) and canceled when not needed anymore.

A recent technology developed in the mobile network field is the EDGE (Enhanced Data rates for GSM Evolution) technology, which has been introduced to boost network capacity and data rates of both circuit switched and packet switched domains in 2G mobile networks, to meet the demand of wireless multimedia applications and mass market deployment. EDGE uses an enhanced modulation, based on 8PSK (Phase Shift Keying), that increases the data rates by up to three fold. As a modification to existing GSM networks, EDGE does not require new network elements, and can co-exist with UMTS, for instance to provide high speed services for wide-area coverage, while UMTS is deployed in urban hot spots.

EDGE modulation increases the data throughput provided by a packet switched service even over 400 kbit/s per carrier. Similarly, the data rates of circuit switched data can be increased, or existing data rates can be achieved using fewer timeslots, saving capacity. Accordingly, these higher speed data services are referred to as EGPRS (Enhanced General Packet Radio Service), for packet-based services, and ECSD (Enhanced Circuit Switched Data), for circuit-based services. The data rates specified by ETSI (European Telecommunication Standard Institute) bring ECSD rates up to 38.4 kbit/timeslot and EGPRS rates up to 60 kbit/timeslot. For ECSD, it is possible to support a 64 kbit/s real time service with a low bit error ratio (BER) by allocating two time slots of 32 kbit/s each.

Document Tdoc SMG2 EDGE 033/99, titled "ECSD (Enhanced Circuit Switched Data)—concept evaluation v. 4.0", presented by Nokia at the ETSI SMG2 Working Session on EDGE, 2-4 Mar. 1999 (Toulouse, France), presents a concept evaluation for ECSD services. According to the document, one of the main applications for ECSD are the video applications. Besides data rates there are other requirements for video transmission. Video services usually include several components, each of them with varying QoS requirements. FIG. 1, extracted from the above mentioned document, shows two concepts in terms of QoS of providing video-telephony service (e.g. video-conferencing call). The differences between the two concepts are in the way of ensuring the QoS for different components: audio, video and data. The concept shown in the FIG. 1 (left) has no means of differentiating QoS for different components. Therefore the QoS of the call should match the QoS requirements of the most demanding component. The concept in FIG. 1 (right) offers possibilities of QoS differentiation for different service components of the call, making the utilization of resources more flexible. However, as observed in the document, in circuit ECSD there is no possibility for providing QoS differentiation without multiple connections.

SUMMARY OF THE INVENTION

The Applicant has noticed that known video-telephony services have a drawback in that they do not allow a user, being party of a video-call, to have the full control of the voice and video components of the communication. For instance, they do not allow to choose to maintain alive only one among the voice and the video component. In other words, if a user activates the video-call, there is no independent control of the different communication components, so that in case the user wants to drop one of the components (e.g. the video component) during the call, the entire video-call must be, actually, dropped.

According to the Applicant, in order to solve the above mentioned drawback a new video-communication service should be provided to the users. The new video-communication service implies: a separation in different components of the video-communication at the telephone equipment of the users, e.g. a separation in a video and in a voice component; the transmission of the different components on different connections between the telephone equipment of the users; the possibility, for the users, of selectively dropping one of the different connections. This latter possibility of selectively dropping one of the different connections (i.e., one of the different components of the video-communication service) may be provided by implementing a suitable man-machine-interface on the telephone equipment of the users.

This video-communication service is different from known video-telephony services in that different connections are used for carrying the communication signal components. However, it gives a similar, if not equal, perception to the user, further adding the possibility of selective control of the different communication components. Advantageously, this video-communication service can be provided also to users having mobile telephone equipment adapted for use in a 2G mobile network (e.g. a GSM/EDGE mobile network), for example exploiting the above mentioned DTM mechanism for establishing the different connections on which the different communication components are to be transmitted. Alternatively, multiple ECSD channels can be exploited.

In a first aspect, the invention relates to a method of performing communication between a first user and a second user in a communication network, the first and the second users being provided with respective first and second telephone equipment, the method comprising:
 generating, at the first telephone equipment, at least a first and a second component of said communication;
 establishing a first connection between said first and said second telephone equipment;
 establishing a second connection between said first and said second telephone equipment;
 transmitting on said first connection said first component and on said second connection said second component of said communication;
 receiving, at the second telephone equipment, said first and said second components; and
 allowing selective dropping of said first or of said second connection to the first or the second user.

In preferred versions of the method, the first component comprises a voice component, wherein said first connection may comprise a circuit switched connection; and the second component may comprise a video component, wherein said second connection may comprise a packet-switched connection. Transmitting of said video component on said second connection is preferably performed at a coding rate of at least 10 kbit/s, more preferably at least 20 kbit/s.

In other preferred embodiments, the method of the present invention further comprises monitoring a quality of a communication channel between said first and said second telephone equipment, wherein the monitoring of said quality of said communication channel may comprise determining if said quality is above a first predetermined threshold; and wherein a metric representative of said quality may comprise at least one among: signal over interference ratio; block error ratio; or overall power in band. The method may further comprise adjusting a parameter related to said video component as a result of the monitoring of said quality of said communication channel, wherein the adjusting of said parameter related to said video component preferably comprises selecting a higher coding rate if said quality is above said first predetermined threshold; and wherein the monitoring of said quality of said communication channel preferably comprises determining if said quality is below a second predetermined threshold, wherein said first threshold is preferably higher than said second threshold; and wherein the adjusting of said parameter related to said video component comprises generating a plurality of still images if said quality is below said second predetermined threshold. The method may further comprise adding synchronizing information to said first and to said second components to allow substantially synchronized combination of said first and said second components at said second telephone equipment, wherein the adding of said synchronizing information may comprise associating a first number of frames of the first component with a second number of frames of the second component; and wherein the associating of said first and said second number of frames may comprise labeling said first and second number of frames with a corresponding flag.

In a second aspect, the invention relates to telephone equipment for performing communication in a communication network, the telephone equipment comprising:
 a coding/decoding unit adapted for generating at least a first and a second component of said communication;
 a transmitting/receiving module adapted for establishing a first and a second connection to further telephone equipment; and
 a user interface adapted for allowing a user of the telephone equipment to selectively drop said first or said second connection;
 wherein said coding/decoding unit is associated with said transmitting/receiving module, so that said first component of said communication is transmitted/received on said first connection and said second component of said communication is transmitted/received on said second connection.

In preferred embodiments of the telephone equipment, the first component comprises a voice component, wherein the first connection may comprise a circuit-switched connection; and the second component may comprise a video component, wherein the second connection may comprise a packet-switched connection. The coding/decoding unit is adapted to code said video component on said second connection preferably at a coding rate of at least 10 kbit/s, more preferably at least 20 kbit/s.

In other preferred embodiments, the telephone equipment may further comprise a monitoring unit adapted for monitoring a quality of a communication channel between said telephone equipment and said further telephone equipment, wherein said monitoring unit is preferably adapted to determine if said quality is above a first predetermined threshold; and wherein a metric representative of said quality may comprise at least one among: signal over interference ratio; block error ratio; or overall power in band. In certain embodiments, said encoding/decoding unit comprises an adjuster of a parameter related to said video component associated with said monitoring unit, and said adjuster of said parameter of said video component may be adapted to select a higher coding rate if said quality is above a first predetermined threshold. In other embodiments, said monitoring unit may be adapted to determine if said quality is below a second predetermined threshold, wherein said first threshold is preferably higher than said second threshold; and said adjuster of said parameter of said video component is adapted to generate a plurality of still images if said quality is below said second predetermined threshold.

In other preferred embodiments, the coding/decoding unit of the telephone equipment further comprises a synchronizer adapted to add information to said first and to said second components to allow substantially synchronized combination of said first and said second components at said further telephone equipment, wherein said synchronizer may be adapted to associate a first number of frames of the first component with a second number of frames of the second component, wherein said synchronizer may be adapted to associate said first number of frames of the first component with said second number of frames of the second component by labeling said first and second number of frames with a corresponding flag.

Features and the advantages of the present invention will be made apparent by the following detailed description of preferred embodiments thereof, provided merely by way of non-limitative example, description that will be conducted by making reference to the attached drawings.

BRIEF DESCRIPTION OF THE DRAWINGS

FIG. 1 conceptually shows a video-conferencing call without QoS differentiation (left) and with QoS differentiation (right), as already described;

DETAILED DESCRIPTION OF PREFERRED EMBODIMENTS OF THE INVENTION

Figure 2:
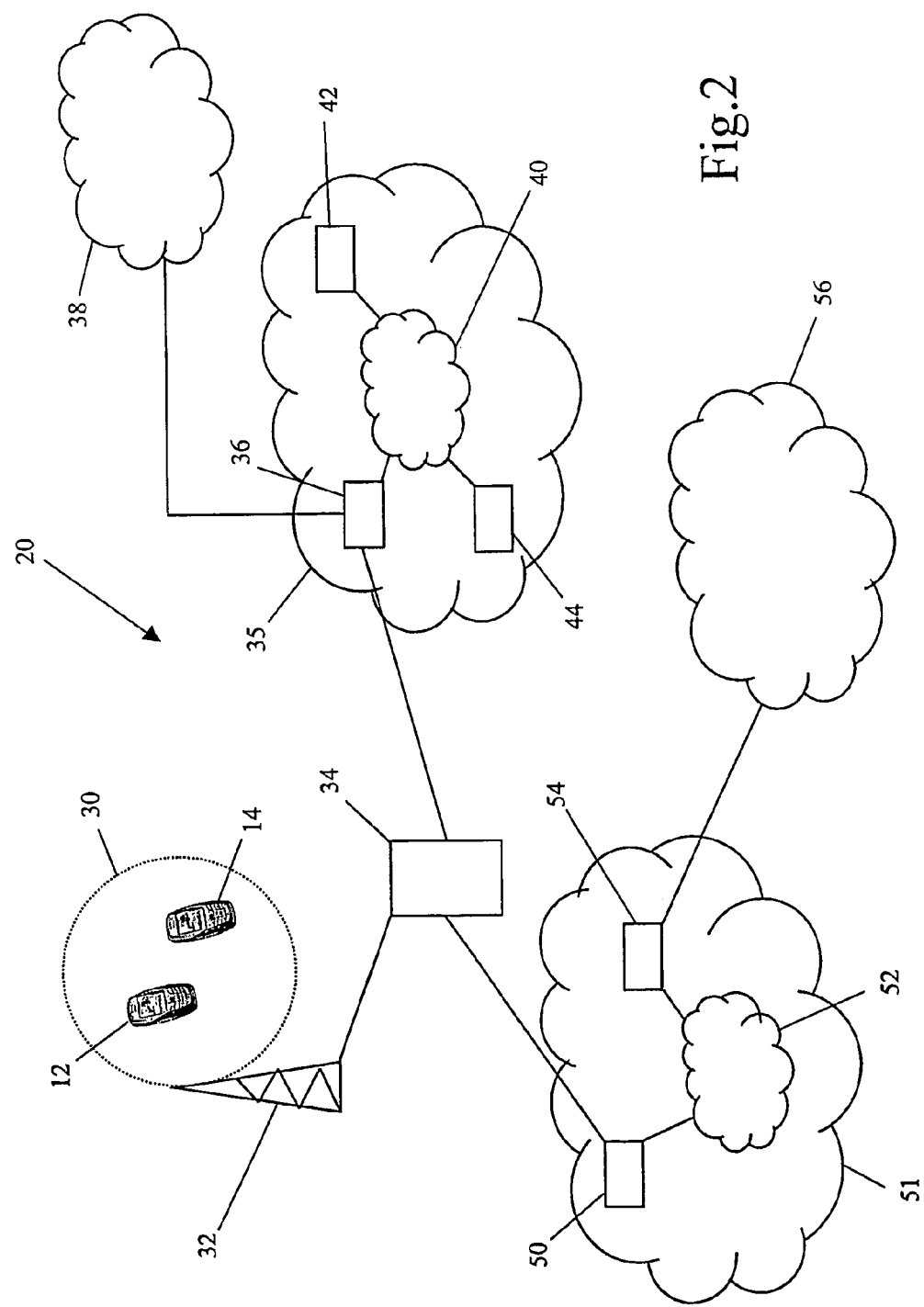
FIG. 2 shows an exemplary GSM/GPRS mobile communication network, supporting a video-communication service according to the invention.

FIG. 2 shows an exemplary mobile communications network 20, providing mobile telephony services according to the GSM/GPRS standard. It is noticed that a mobile network providing mobile telephony services according to the UMTS standard has a very similar structure to the mobile network of FIG. 2. The mobile network 20 supports both circuit-switched and packet-switched communications, and includes a circuit-switched network 35 and a packet-switched network 51. Mobile telephone equipment 12, 14 (e.g. cellular telephones, personal digital assistants, etc.) communicate over a radio interface with one or more base transmitter stations (BTSs) 32. Each base transmitter station 32 provides service in a corresponding cell 30. It is understood that the mobile network 20 provides service to a number of cells and to a number of telephone equipment much higher than those shown for exemplary purposes in FIG. 2. Multiple base transmitter stations 32 are connected to a base station controller (BSC) 34, which manages the allocation and de-allocation of radio resources and controls handovers of mobile stations from one base transmitter station to another. A base station controller and its associated base transmitter stations are typically referred to as a base station subsystem (BSS). The BSC 34 is connected to a mobile switching center (MSC) 36 in the GSM circuit-switched network 35 through which circuit-switched connections are set up with other networks 38 such as a Public Switched Telephone Network (PSTN), Integrated Services Digital Network (ISDN), etc. In widespread networks, a plurality of BSCs, such as the BSC 34 shown in FIG. 2, is connected to a single MSC.

The MSC 36 is also connected via a signaling network 40 (e.g. a Signaling System Number 7, or SS7, network) to a Home Location Register (HLR) 42, and to a Visitor Location Register (VLR) 44. The VLR 44 includes a database containing the information about all mobile stations currently located in a corresponding location or service area, as well as temporary subscriber information needed by the MSC to provide services to mobiles in its service area. Typically, when a mobile station enters a visiting network, or service area, the corresponding VLR 44 requests and receives data about the roaming mobile station from the mobile's HLR and stores it. As a result, when the visiting mobile station is involved in a call, the VLR 44 already has the information needed for call setup.

The HLR 42 comprises a database that stores and manages subscriptions of the users of the mobile network 20, such as the users owning the telephone equipment 12, 14. For each "home" mobile subscriber, the HLR contains permanent subscriber data such as the mobile station ISDN number (MSISDN), which uniquely identifies the mobile telephone subscription in the PSTN numbering plan, and an international mobile subscriber identity (IMSI), which is a unique identity allocated to each subscriber and used for signaling in the mobile networks. All network-related subscriber information is connected to the IMSI. The HLR 42 also contains, in a so-called "profile", a list of services which a mobile subscriber is authorized to use along with a current subscriber location number corresponding to the address of the VLR currently serving the mobile subscriber.

Each BSC 34 also connects to the GSM packet-switched network corresponding to GPRS network 51 at a Serving GPRS Support Node (SGSN) 50, responsible for delivery of packets to the mobile stations within its service area. In a widespread network, a plurality of BSCs, such as the BSC 34 of FIG. 2, is connected to a single SGSN. A gateway GPRS support node (GGSN) 54 acts as a logical interface to external data packet networks such as the IP data network 56. SGSN nodes 50 and GGSN nodes 54 are connected with each other by an intra-PLMN IP backbone 52. Typically, between the SGSN 50 and the GGSN 54, the Internet protocol (IP) is used as the backbone to transfer data packets.

Figure 3:
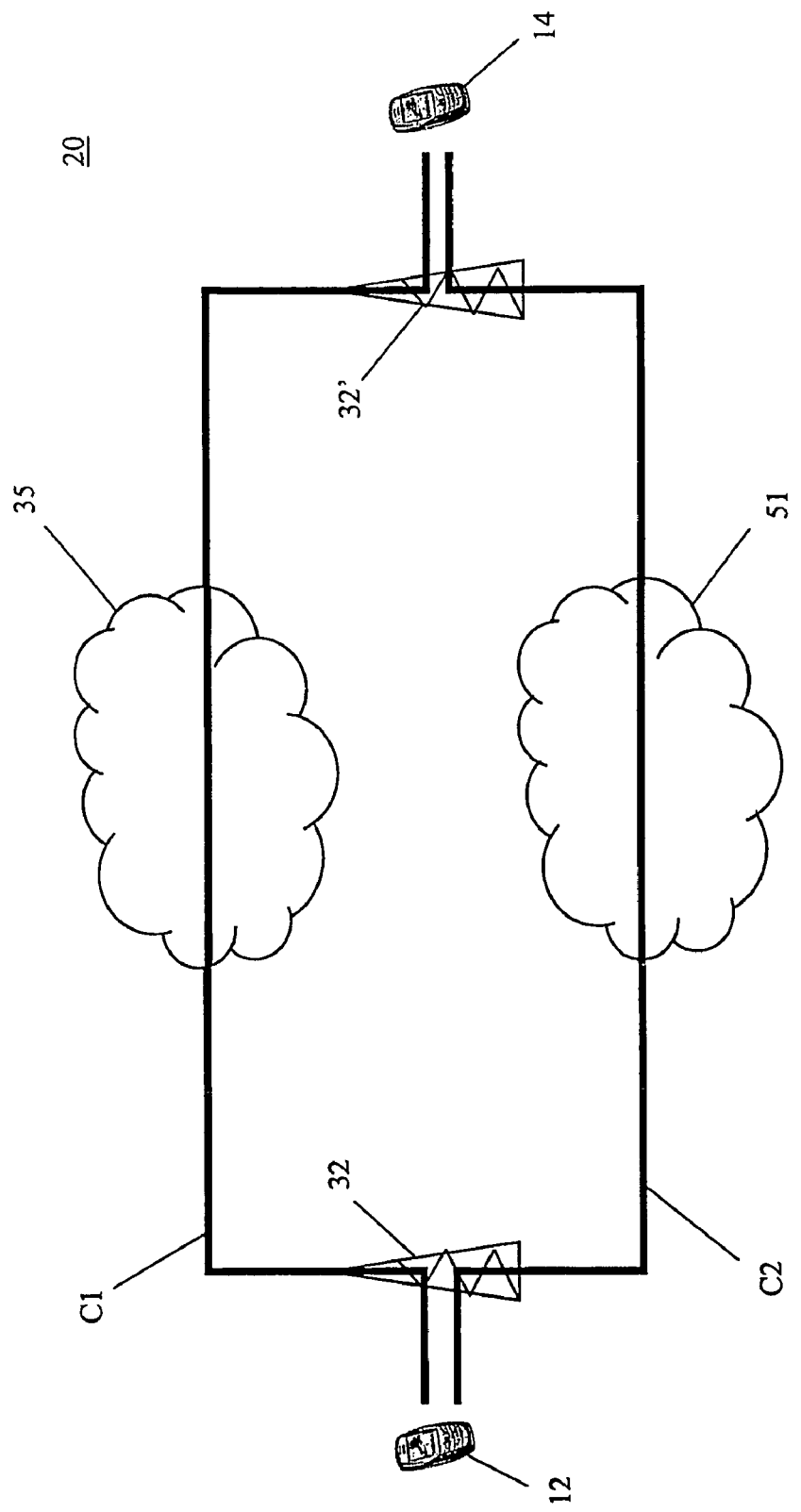
FIG. 3 schematically shows how to implement one embodiment of the present invention.

The exemplary mobile network 20 of FIG. 2 supports embodiments of a mobile video-communication service according to the invention, the implementation of which is schematically shown in FIG. 3. With reference to FIG. 3, a first user owning a first mobile telephone equipment 12 places a call to a second user owning a second mobile telephone equipment 14. The first mobile telephone equipment 12 is camping under a BTS 32, and the second mobile telephone equipment is camping under a BTS 32', which may be the same BTS under which the first mobile telephone equipment is camping or a different one.

The call is such that the first and the second user are allowed to video-communicate, i.e. to see with each other during their conversation, substantially in real-time (but for delays introduced by the mobile network). The call is split in a first component (e.g. a voice, or speech, component) and a second component (e.g. a video component). A first connection C1 is established for supporting the speech component. The first connection C1 is a bidirectional connection between the first mobile telephone equipment 12 and the second mobile telephone equipment 14. The first connection C1 is preferably established as a circuit-based connection, so as it is routed by the circuit-switched network 35 of the mobile network 20. A second connection C2 is established for supporting the video component. The second connection C2 is a bidirectional connection between the first mobile telephone equipment 12 and the second mobile telephone equipment 14. The second connection C2 is preferably established as a packet-based connection, so as it is routed by the packed-switched network 51 of the mobile network 20. However, the second connection could be established as a circuit-based connection in a UMTS network. The voice component is transmitted by the first connection C1, whereas the video component is transmitted by the second connection C2. On the second connection C2, i.e. on the connection dedicated for the video component, a throughput of at least 10 kbit/s should be preferably available, more preferably of at least 20 kbit/s, in order to allow transmission of a video having an acceptable quality.

If the mobile network 20 is a 2G (e.g. an EDGE GSM/GPRS) network, the connections C1 and C2 may be exemplarily established using the DTM (dual transfer mode) technology, e.g. according to the DTM Technical Specification 3GPP TS 43.055 V6.4.0 (2004 February) "Dual Transfer Mode". For example, each of the connections C1 and C2 may use one timeslot on the uplink and one timeslot on the downlink. For such exemplary implementation, class 5 or class 9 mobile phones, allowing availability of at least one timeslot per direction on the packet-based connection (i.e. connection C2 in FIG. 3), can be used. Reasonable throughputs per timeslot obtainable on the packet connection for the video component, using the EDGE technology, are in the range from 10 to 40 kbit/s, sufficient for supporting a video transmission having a good or at least an acceptable quality. However, it is noticed that higher throughputs may be obtained with a higher quality radio channel. With regards to the connection dedicated to the voice component (i.e. connection C1 in FIG. 3), a standard GSM connection can be used (half rate or full rate), or a higher speed ECSD connection.

If the mobile network 20 is a 3G (e.g. UMTS) network, the connection C1 (dedicated to the voice component) may exemplarily established as a 12.2 kbit/s circuit-switched radio access bearer (RAB), allowing a throughput of 12.2 kbit/s on both the uplink and the downlink channel, whereas the connection C2 (dedicated to the video component) may be exemplarily established as a 64 kbit/s packet-switched RAB, allowing a throughput of 64 kbit/s on both the uplink and the downlink channel. It is noticed that a 3G network allows, especially in the packet-switched domain, an available higher throughput than that allowed by an EGPRS network. Thus, a video component having a higher quality may be, generally, transmitted on the dedicated connection C2. However, even in a 3G network the available throughput can significantly change as a function of the radio conditions, and/or of the level of congestion of the network.

Independently of the fact that a 2G or a 3G network is used, a video-communication service according to the invention allows a user, owning a suitable mobile telephone equipment, to separately control the different components of the video-communication (e.g. the voice and the video component), at its own convenience, without noticeable restrictions. A proper man-machine-interface (MMI) can be provided on the mobile telephone equipment, e.g. at the application level, for helping the user in the control of the separate components. For example:
 a) a user may decide, e.g. by pushing a proper button on the MMI, to start both voice and video, voice only, or even video only;
 b) in a voice only case, at any time while the speech service is ongoing, the user can start also the video component;
 c) in a video only case, at any time while the video service is ongoing, the user can start also the speech component;
 d) in a both video-voice case, at any time the user can stop the video component;
 e) in a both video-voice case, at any time the user can stop the speech component.

Advantageously, a separation of the voice and video component allows a simplified billing mechanism to be implemented in order to fairly charge the users for the use of the service. For example, a first tariff may be applied for a voice-only call, a second tariff may be applied for a video-only call, a third tariff may be applied for a voice-video call. Thus, the set-up of different connections for the different components of the communication allows to charge a user of the service based, e.g., on the time of use of the established connections.

In order to limit, or even avoid, lack of synchronization between the different components sent on respective, dedicated different connections, a synchronization protocol may be preferably implemented, e.g. in an applicative client, at the mobile telephone equipment 12, 14. Acceptable synchronization levels may correspond to a maximum delay of 100 ms, preferably of 80 ms, between correlated portions of the different communication components. For the purpose of implementing the synchronization protocol, synchronization information may be added at the transmitting mobile telephone equipment to the different communication components, to allow the receiving mobile telephone equipment to correctly combine in the time domain the different components. In preferred embodiments, a first predetermined number of frames of the first (e.g. speech) component may be associated with a second predetermined number of frames of the second (e.g. video) component. For video and speech components, this may practically result in associating each image of the video component with a correlated piece of speech. The association between the frames of the first component and the frames of the second component may be carried out, for example, by stamping thereof a corresponding sequence-labeling flag. A coding rate of the transmitted first and second components may be taken into account in order to correctly correlate the frames of the first component with the frames of the second component.

With regards to the quality of service, preferred embodiments of the invention may provide monitoring of the radio communication channel used for establishing the end-to-end connections between the first and the second mobile telephone equipment 12, 14. It is not necessary to monitor the quality of service of all the different connections respectively dedicated to the different communication components. For example, the video component may be provided as a best effort service, e.g. on a best effort packet-switched bearer with no QoS monitoring, whereas the speech component may take advantage of a QoS monitored circuit-based connection.

However, the provision of a separate transmission, on different connections, of different communication components, e.g. of video and speech components, may advantageously allow to separately and independently adjust the transmission of the different components as a function of the quality of the radio channel on the different connections.

In particular, this may be of great help for coping with a problem that may arise on a packet-switched bearer used for transmission of the Video component, that is the possible variation of the maximum available throughput on the packet-switched bearer, variation that may occur due to many factors, such as for example the radio quality level, and/or the congestion level of the packet-switched network. In preferred embodiments, a mechanism is introduced, at the mobile telephone equipment 12, 14, for adjusting the quality of the video component (e.g. changing the coding rate of the video codec, or the definition of the video image, or the size of the video image), as a function of the available bandwidth on the packet-switched connection. If the network resources are properly sized, and/or the packet-switched network is configured so as to give a priority to the video-telephony service (e.g. versus best effort services), it can be assumed that the available bandwidth practically depends only on the radio quality conditions. Therefore, a mechanism can be advantageously introduced in the mobile telephone equipment, aimed at the monitoring of the radio channel quality on the packet-switched connection. For example, a suitable software program running at the application layer of the mobile telephone equipment may interact with the lower layers, especially the RLC/MAC layer, in order to monitor the radio channel quality. Available metrics for measuring the radio channel quality may be, for example, the C/I (i.e. the signal to interference ratio), and/or the BLER (Block Error Ratio, i.e. the ratio of the blocks received with errors versus the total number of received blocks), and/or the RSSI (Received Signal Strength Indicator, i.e. the overall power in the frequency band measured at the receiver of the telephone equipment). In this respect, it is noticed that a suitable metrics for evaluating the radio channel quality may be chosen in dependence of many factors, such as the mobile telephone equipment model, the operating system used by the mobile telephone equipment software, etc.

While the service is ongoing, the quality of the radio channel (e.g. of the downlink channel) may be continuously monitored (e.g. at predefined time periods) by both telephone equipment 12, 14, in particular for the connection supporting the video component transmission. Based on the result of the monitoring, a parameter related to the quality (e.g. the coding rate) of the video component may be adjusted in the telephone equipment 12, 14. Threshold-based mechanisms may be exploited, in which the video quality is increased when the radio channel quality is higher than (or equal to) the threshold, or reduced when the radio channel quality is lower than (or equal to) the threshold. Exchange of signaling messages between the telephone equipment 12 and the telephone equipment 14 may be provided, in order to allow a correct adjustment of the video quality at both ends of the communication.

For example, a possible implementation may adjust the coding rate of the video component according to the following rules:
 a) if $C/I \geqq 18$ dB (very good channel), then the coding rate is adjusted to at least 30 kbit/s;
 b) if $12$ dB$\leqq C/I < 18$ dB (medium quality channel), then the coding rate is adjusted around 20 kbit/s, e.g. in a range between 18-22 kbit/s;
 c) if $9$ dB$\leqq C/I < 12$ dB (low quality channel), then the video transmission is changed from motion video transmission to still images transmission;
 d) if $C/I < 9$ dB (bad radio channel), then the video transmission is stopped (a courtesy message may be shown to the user, explaining that the video service is not available).

It is observed that all the values in dB for the C/I thresholds, as well as the throughput values in kbit/s of the coding rate are purely exemplary; the skilled in the art can set the thresholds and the video quality according to its own requirements and/or according to the characteristics of the network used.

Figure 4:
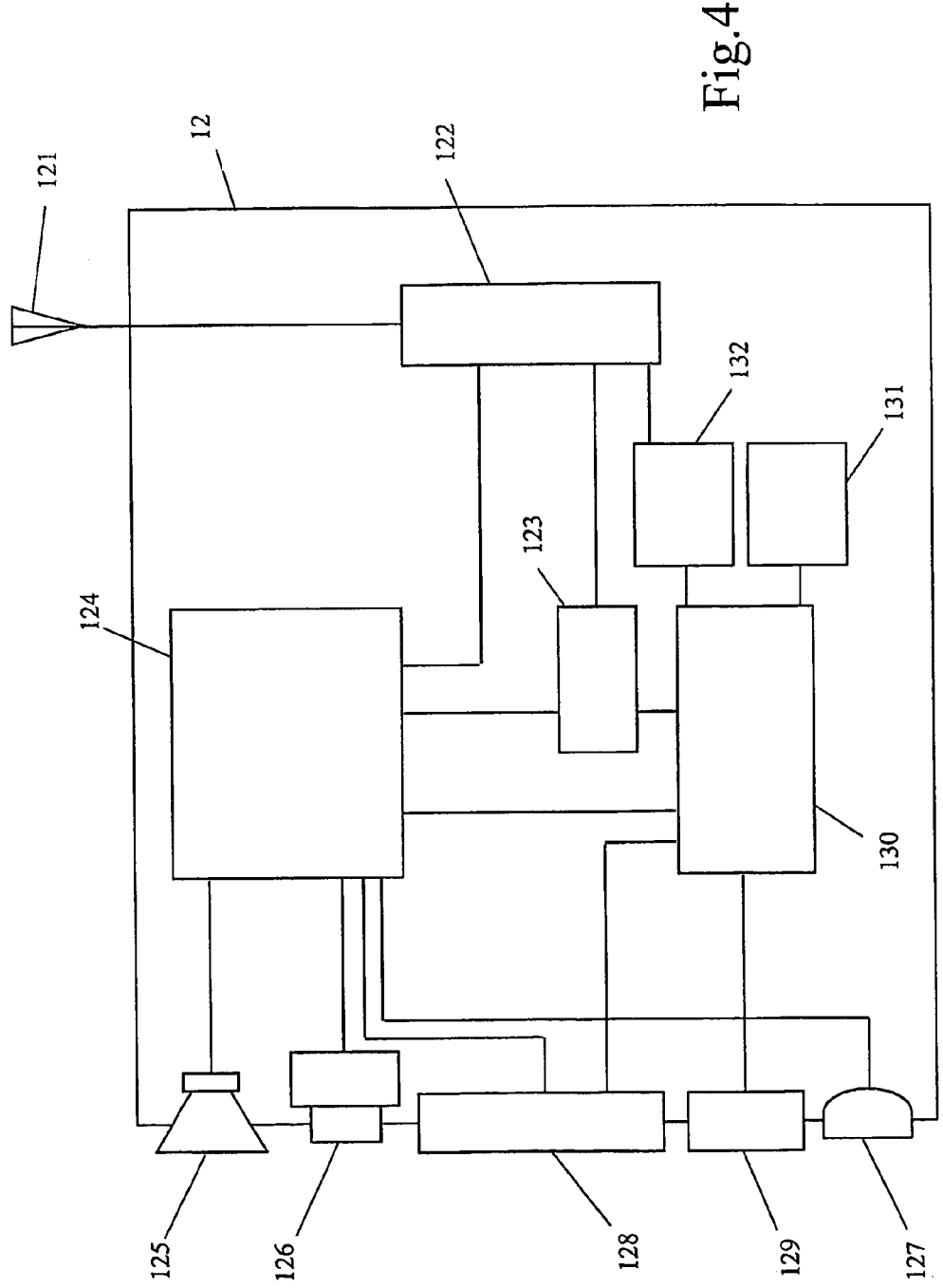
FIG. 4 schematically shows an exemplary mobile telephone equipment adapted for carrying out a video-communication service according to the invention.

FIG. 4 shows an exemplary mobile telephone equipment 12 adapted for carrying out a video-communication service according to the invention. The mobile telephone equipment 12 comprises a transmit/receive antenna 121, a radio frequency transceiver 122, a GPRS module 123, an encoder/decoder 124, a loudspeaker 125, a video-camera 126, a microphone 127, a display 128, a keyboard 129, a central processing unit (CPU) 130 with an associated memory 131, a monitoring unit 132. The mobile telephone equipment may be typically associated with a removable subscriber identity module (SIM), not shown in FIG. 4, via electrical contacts.

The antenna 121 and the radio-frequency transceiver 122 conventionally allow communication to/from the BTSs of the mobile network. The loudspeaker 125 and the microphone 127 conventionally transform an electrical signal corresponding to the speech component of the communication in a speech signal audible to a user owning the mobile telephone equipment 12, and viceversa. The keyboard 129 conventionally allows the user to manually interact with the mobile telephone equipment, in order to send commands for, e.g., a choice from a menu of different options, or for selection of a phone number, etc. The display 128 may be, for example, a liquid crystal display (LCD), and is conventionally capable of displaying still and video images. The video-camera 126, for example a CCD (Charge-Coupled Device) camera, is conventionally capable of picking still and/or video images. The GPRS module 123 conventionally includes a packetiser/depacketiser, and a buffer store, for the packing/unpacking of the data packets from the radio blocks respectively received from or to be sent to the network, via the radio-frequency transceiver 122 and the antenna 121. The CPU 130 supervisions the activities of the various modules included in the mobile telephone equipment 12. The memory 131, associated with the CPU 130, includes software programs implementing procedures and protocols needed for properly managing the communication. The monitoring unit 132, associated with the CPU 130 and with the transceiver 122, allows a monitoring of the quality of the radio channel.

More particularly, the memory 131 may store a MMI adapted to allow a user owning the mobile telephone equipment 12 to select the components of the video-communication to be maintained (e.g. both voice and video, voice only, video only), as discussed above.

The encoder/decoder unit 124 is connected to the loudspeaker 125, to the microphone 127, to the display 128, to the video-camera 126, and manages the proper coding/encoding of video and voice components of the video-communication.

While in FIG. 4 the encoder/decoder unit 124 has been shown as a separate entity, it may be realized as a particular software program stored within the memory 131. More particularly, during the video-communication according to the invention the encoder/decoder unit 124 may manage the synchronization of the voice and of the video component to be transmitted on the separate radio connections, as discussed above. Furthermore, the encoder/decoder unit 124 may manage the proper, synchronized combination of the voice and video components including synchronizing information received from the separate radio connections, as discussed above. Moreover, the encoder/decoder unit 124 may manage the adjustment of the coding rate of the video component to be transmitted on the packet-switched connection, as discussed above.

Figure 5:
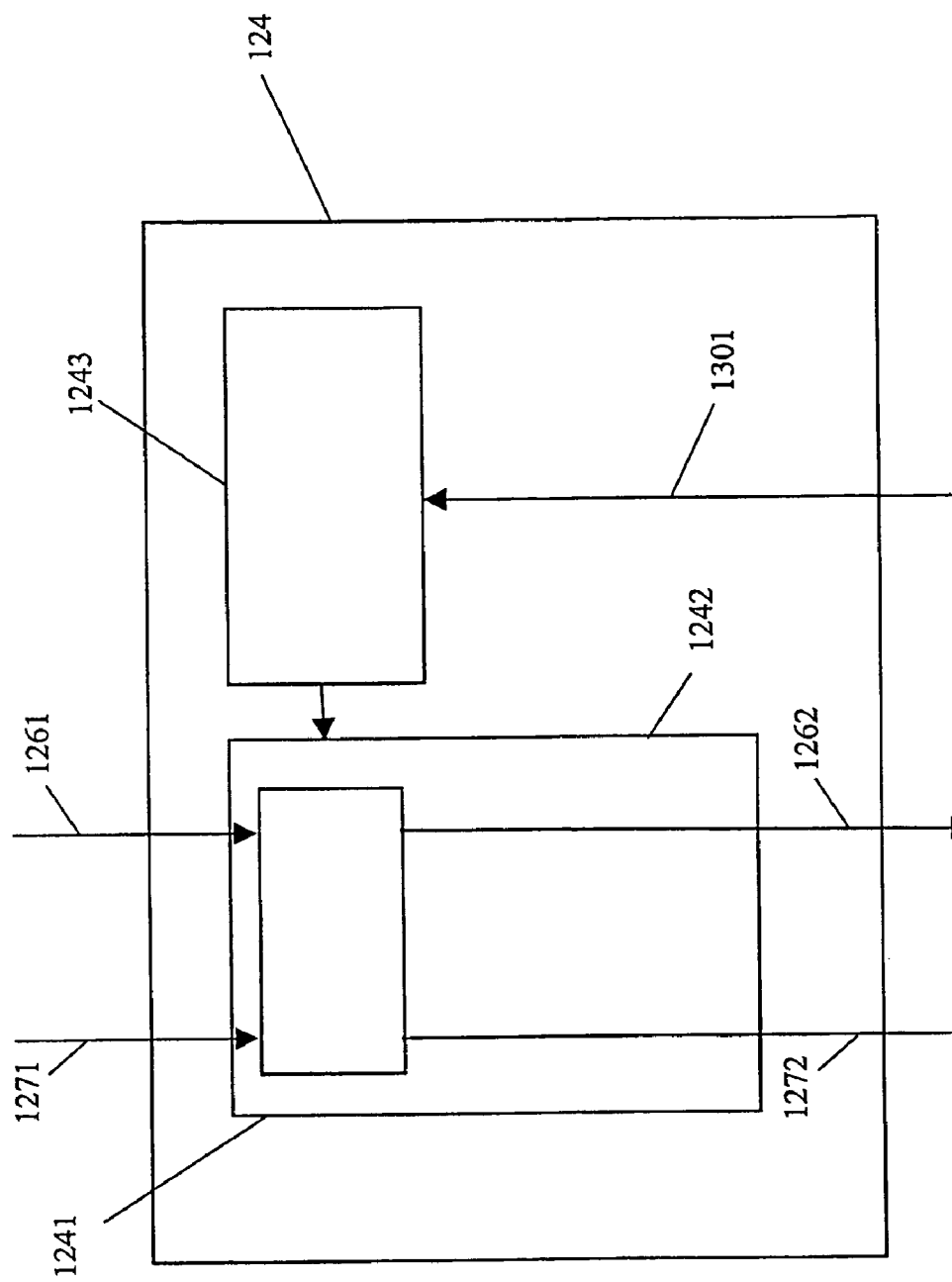
FIG. 5 schematically shows a possible implementation of a coding/decoding unit to be used in a mobile telephone equipment adapted for carrying out a video-communication service according to the invention.

In more detail, FIG. 5 schematically shows a possible implementation of an encoding/decoding unit 124 adapted to be used in a mobile telephone equipment 12 such as that shown in FIG. 4.

The encoding/decoding unit 124 comprises an encoder/decoder (or codec) 1241, in which a proper coding rate is applied to a voice component 1271, originated from the microphone 127 (see FIG. 4), and to a video component 1261, originated from the video-camera 126 (see FIG. 4). FIG. 5 shows the voice and video fluxes entering the codec 1241 as separate: however, a single communication flux, comprising both the video and the voice component, may be also inputted/outputted to/by the codec 1241.

The codec 1241 outputs two separate coded streams, a first one 1272 for the voice component and a second one 1262 for the video component. An adjuster 1243 may interact with the codec 1241, in order to adjust the quality (e.g. of the coding rate) of the communication streams. This may particularly apply for the coding of the video stream component 1262. The adjustment of the coding rate (or of any other parameter related to the quality of the communication streams) may be based on data 1301 related to the quality of the radio communication channel, as discussed above. Such data 1301 may be made available, for example, by the CPU 130 (see FIG. 130), that may command and supervision the monitoring of the radio channel. In one embodiment, not shown in FIG. 5, a plurality of codec, such as the codec 1241 of FIG. 5, may be provided, each of which being adapted to work at a respective coding rate. In this embodiment, the adjuster 1243 may select the proper codec (i.e. the proper coding rate) based on data 1301.

A synchronizer 1242 is also included in the codec 1241, for adding synchronizing information to the voice and video streams, as discussed above. The synchronizer 1242 takes the voice and video streams 1271, 1261, and adds signaling information thereof, for associating the video frames to the corresponding audio frames. In practice, this may result in an association, with a corresponding flag, of a number of audio frames with each single video frame.

The synchronized voice and video streams 1272, 1262, outputted from the codec 1241, are then sent towards the radio-frequency transceiver 122, possibly via the GPRS module (for the video component) 123 (see FIG. 4), for transmission on the separate connections C1 and C2 (see FIG. 3).

The behavior of the encoding/decoding unit 124 during reception from the separate connections C1 and C2 may be inherited by FIG. 5, simply by reversing the orientation of the arrows representing the separate video and audio streams (1261, 1271, 1262, 1272). During reception, synchronization information is decoded from the audio and video streams 1272, 1262, coming from the connections C1 and C2, at the synchronizer 1242, so as to allow synchronization of the two components. Proper decoding of the audio and video components is performed at the codec 1241, possibly with the aid of the adjuster 1243 for the adjustment of, e.g., the coding rate for the decoding. After decoding, the audio and video components are then forwarded, respectively, to the loudspeaker 125 and to the display 128 (see FIG. 4), in order to be played.

Although the present invention has been disclosed by way of some embodiments thereof, it is apparent to those skilled in the art that that several modifications are possible without departing from the scope of the present invention, defined by the following claims. In particular, it is noticed that although the present invention has been disclosed with particular reference to a mobile network, the teachings of the present invention may be adapted also for implementing a service according to the invention in a fixed (e.g. PSTN) network.

The invention claimed is:

1. A method of performing a double component communication between a first user and a second user in a communication network, the first and the second users being provided with respective first and second telephone equipment, both said first and second telephone equipment being adapted to manage two separate components and two separate end-to-end connections of said communication, comprising:
   generating, at the first telephone equipment, at least a first and a second component of said communication;
   establishing a first end-to-end connection between said first and said second telephone equipment;
   establishing a second end-to-end connection between said first and said second telephone equipment;
   transmitting on said first end-to-end connection said first component and on said second end-to-end connection said second component of said double communication;
   receiving, at the second telephone equipment, said first and said second components;
   providing said first and said second telephone equipment with a respective user interface; and
   allowing selective dropping of said first or of said second end-to-end connection to the first or the second user by means of the respective user interface.

2. The method of claim 1, wherein said first component comprises a voice component.

3. The method of claim 2, wherein said first end-to-end connection comprises a circuit-switched connection.

4. The method of claim 1, wherein said second component comprises a video component.

5. The method of claim 4, wherein said second end-to-end connection comprises a packet-switched connection.

6. The method of claim 4, wherein said transmitting of said video component on said second end-to-end connection is performed at a coding rate of a least 10 kbit/s.

7. The method of claim 6, wherein said coding rate is at least 20 kbit/s.

8. The method of claim 1, further comprising monitoring a quality of a communication channel used for establishing said first and said second end-to-end connection between said first and said second telephone equipment.

9. The method of claim 8, wherein the monitoring of said quality of said communication channel comprises determining if said quality is above a first predetermined threshold.

10. The method of claim 8, wherein a metric representative of said quality comprises at least one among: signal over interference ratio; block error ratio; or overall power in band.

11. The method of claim 8, further comprising adjusting a parameter related to a video component as a result of the monitoring of said quality of said communication channel.

12. The method of claim 11, wherein the adjusting of said parameter related to said video component comprises selecting a higher coding rate if said quality is above a first predetermined threshold.

13. The method of claim 12, wherein the monitoring of said quality of said communication channel comprises determining if said quality is below a second predetermined threshold.

14. The method of claim 13, wherein said first predetermined threshold is higher than said second predetermined threshold.

15. The method of claim 13, wherein the adjusting of said parameter related to said video component comprises changing the transmission of said video component from motion video transmission to still images transmission if said quality is below said second predetermined threshold.

16. The method of claim 1, further comprising adding synchronizing information to said first and to said second components, to allow substantially synchronized combination of said first and said second components at said second telephone equipment.

17. The method of claim 16, wherein the adding of said synchronizing information comprises associating a first number of frames of the first component with a second number of frames of the second component.

18. The method of claim 17, wherein the associating of said first and said second number of frames comprises labeling said first and second number of frames with a corresponding flag.

19. Telephone equipment for performing a double component communication in a communication network, said telephone equipment being adapted to manage two separate components of said communication and two separate end-to-end connections, said telephone equipment comprising:
a coding/decoding unit adapted for generating at least a first and a second component of said communication;
a transmitting/receiving module adapted for establishing a first and a second end-to-end connection to further telephone equipment;
a user interface adapted for allowing a user of the telephone equipment to selectively drop said first or said second end-to-end connection; and
wherein said coding/decoding unit is associated with said transmitting/receiving module, so that said first component of said communication is transmitted/received on said first end-to-end connection and said second component of said communication is transmitted/received on said second end-to-end connection.

20. The telephone equipment of claim 19, wherein said first component comprises a voice component.

21. The telephone equipment of claim 20, wherein said first end-to-end connection comprises a circuit-switched connection.

22. The telephone equipment of claim 19, wherein said second component comprises a video component.

23. The telephone equipment of claim 22, wherein said second end-to-end connection comprises a packet-switched connection.

24. The telephone equipment of claim 22, wherein said coding/decoding unit is adapted to code said video component on said second end-to-end connection at a coding rate of at least 10 kbit/s.

25. The telephone equipment of claim 24, wherein said coding rate is at least 20 kbit/s.

26. The telephone equipment of claim 19, further comprising a monitoring unit adapted for monitoring a quality of a communication channel used for establishing said first and said second end-to-end connections between said telephone equipment and said further telephone equipment.

27. The telephone equipment of claim 26, wherein said monitoring unit is adapted to determine if said quality is above a first predetermined threshold.

28. The telephone equipment of claim 26, wherein a metric representative of said quality comprises at least one among: signal over interference ratio; block error ratio; or overall power in band.

29. The telephone equipment of claim 26, wherein said encoding/decoding unit comprises an adjuster of a parameter related to a video component associated with said monitoring unit.

30. The telephone equipment of claim 29, wherein said adjuster of said parameter of said video component is adapted to select a higher coding rate if said quality is above a first predetermined threshold.

31. The telephone equipment of claim 30, wherein said monitoring unit is adapted to determine if said quality is below a second predetermined threshold.

32. The telephone equipment of claim 31, wherein said first predetermined threshold is higher than said second predetermined threshold.

33. The telephone equipment of claim 31, wherein said adjuster of said parameter of said video component is adapted to change the transmission of said video component from motion video transmission to still images transmission if said quality is below said second predetermined threshold.

34. The telephone equipment of claim 19, wherein said coding/decoding unit further comprises a synchronizer adapted to add information to said first and to said second components to allow substantially synchronized combination of said first and said second components at said further telephone equipment.

35. The telephone equipment of claim 34, wherein said synchronizer is adapted to associate a first number of frames of the first component with a second number of frames of the second component.

36. The telephone equipment of claim 35, wherein said synchronizer is adapted to associate said first number of frames of the first component with said second number of frames of the second component by labeling said first and second number of frames with a corresponding flag.

* * * * *